United States Patent [19]

Havemann

[11] Patent Number: 4,932,841
[45] Date of Patent: Jun. 12, 1990

[54] COMBINATION OIL PRESSURE REGULATOR AND LOW OIL PRESSURE DETECTOR FOR REFRIGERANT COMPRESSOR

[75] Inventor: Robert K. Havemann, Bloomington, Minn.

[73] Assignee: Thermo King Corporation, Minneapolis, Minn.

[21] Appl. No.: 325,757

[22] Filed: Mar. 20, 1989

[51] Int. Cl.$^5$ .................... F04B 39/02; F16K 37/00
[52] U.S. Cl. .................................. 417/63; 417/44; 417/307; 137/509; 200/82 R; 184/6.4
[58] Field of Search ............... 184/6.4, 108; 137/557, 137/509; 200/81 R, 82 R; 417/63, 44, 307

[56] References Cited

U.S. PATENT DOCUMENTS

| 1,309,362 | 7/1919 | Lehmann . |
|---|---|---|
| 2,809,248 | 10/1957 | Frakes . |
| 3,026,387 | 3/1962 | Ashbaugh ........................ 184/6.4 |
| 3,239,624 | 3/1966 | Clason . |
| 3,239,625 | 3/1966 | Clason . |
| 3,644,915 | 2/1972 | McBurnett . |
| 4,278,856 | 7/1981 | Owens . |
| 4,423,751 | 1/1984 | Roettgen ........................ 137/557 |
| 4,468,170 | 8/1984 | Hanset . |
| 4,586,875 | 5/1986 | Aman, Jr. . |
| 4,635,671 | 1/1987 | Viegas . |
| 4,711,266 | 12/1987 | Lieber . |
| 4,740,140 | 4/1988 | Benson . |
| 4,763,688 | 8/1988 | Morris ........................... 137/509 |

FOREIGN PATENT DOCUMENTS

| 719909 | 10/1965 | Canada . |
|---|---|---|
| 381735 | 9/1923 | Fed. Rep. of Germany . |
| 2173344A | 10/1986 | United Kingdom . |

Primary Examiner—Leonard E. Smith
Assistant Examiner—David W. Scheuermann
Attorney, Agent, or Firm—D. R. Lackey

[57] ABSTRACT

A combination oil pressure regulator and low oil pressure indicator for regulating the maximum oil pump pressure of a refrigerant compressor, and for providing a signal or indication when the oil pressure falls below a predetermined minimum value. The position of a piston in a housing is controlled by opposing forces provided by the oil pressure to be monitored and by a compression spring. When the oil pressure reaches a predetermined maximum value, relief apertures in the piston and housing establish a pressure relief path to the compressor crank case. When the oil pressure drops below a predetermined minimum value, the piston contacts and electrically grounds an electrically conductive element, providing a signal for associated control.

8 Claims, 2 Drawing Sheets

COMBINATION OIL PRESSURE REGULATOR AND LOW OIL PRESSURE DETECTOR FOR REFRIGERANT COMPRESSOR

TECHNICAL FIELD

The invention relates in general to refrigerant compressors, and more specifically to oil pressure regulators and low oil pressure sensors for refrigerant compressors.

BACKGROUND ART

U.S. Pat. No. 4,586,875, which is assigned to the same assignee as the present application, discloses a refrigerant compressor having an oil pump for lubricating the compressor. In addition to the pressure regulator disposed in a pressure regulator bore of the compressor/pump housing, although not shown in the '875 patent, a separate external pressure switch is also required, which is connected to be responsive to the pressure being provided by the oil pump. The pressure switch operates when the oil pressure drops below a predetermined minimum value. Since the compressor crank case is sealed to the associated closed refrigeration system, the crank case pressure varies both above and below atmospheric pressure. Thus, a pressure switch requires a balance line connected to communicate compressor crank case pressure to the switch, for proper operation of the switch, and also for returning oil which leaks through the switch back to the compressor crank case. The pressure switch adds additional cost to the refrigerant compressor, and the balance line provides the opportunity for external oil leaks.

SUMMARY OF THE INVENTION

Briefly, the present invention is a combination oil pressure regulator and low oil pressure indicator for regulating and monitoring the oil pressure of an oil pump which is operatively associated with a refrigerant compressor having a crank case containing oil to be distributed to compressor lubricating points by the oil pump. An oil return path integral with the compressor/pump housing also functions as a balance line, eliminating the need for an external balance line, which is prone to leakage.

More specifically, the oil pressure regulator and indicator includes an elongated regulator housing having first and second ends, and a central cavity which extends between the ends. The first end functions as an inlet passage for fluid flow communication with the oil pressure to be regulated and monitored, and a fluid-tight cap seals the second end. An elongated electrically conductive piston is disposed for axially slidable movement within the cavity of the regulator housing, with the piston having first and second ends and a central cavity which extends between the ends. Bias means in the form of a compression spring urges the piston towards the second end of the regulator housing, and the central cavity of the piston communicates oil pressure to the second end of the regulator housing to develop a force on the piston which opposes the bias force. An increasing oil pressure moves the piston axially towards the first end of the regulator housing until relief apertures in both the regulator housing and piston start to align at a predetermined oil pressure to provide an oil pressure regulating relief path back to the compressor crank case via the integral oil return path.

An electrically conductive member is insulatively carried by the fluid-tight cap at the second end of the regulator housing, which member is accessible within the cavity of the regulator housing. When the compressor is not operating, and when the compressor is operating and the oil pressure is below a predetermined minimum safe value, the bias spring forces the piston all the way to the second end of the regulator housing. The electrically conductive piston contacts and electrically grounds the electrically conductive member carried by the fluid-tight cap, providing a signal for associated control that the compressor prime mover should be shut down.

The oil return path is only disposed in fluid flow communication with the high pressure side of the oil supply when the regulating pressure is reached. The oil return path is always in fluid flow communication with the bias side of the piston, however, to properly balance the piston for accurate positioning thereof by the difference between the bias force and oil pressure force, as well as to return any oil to the compressor crank case which leaks by the piston.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
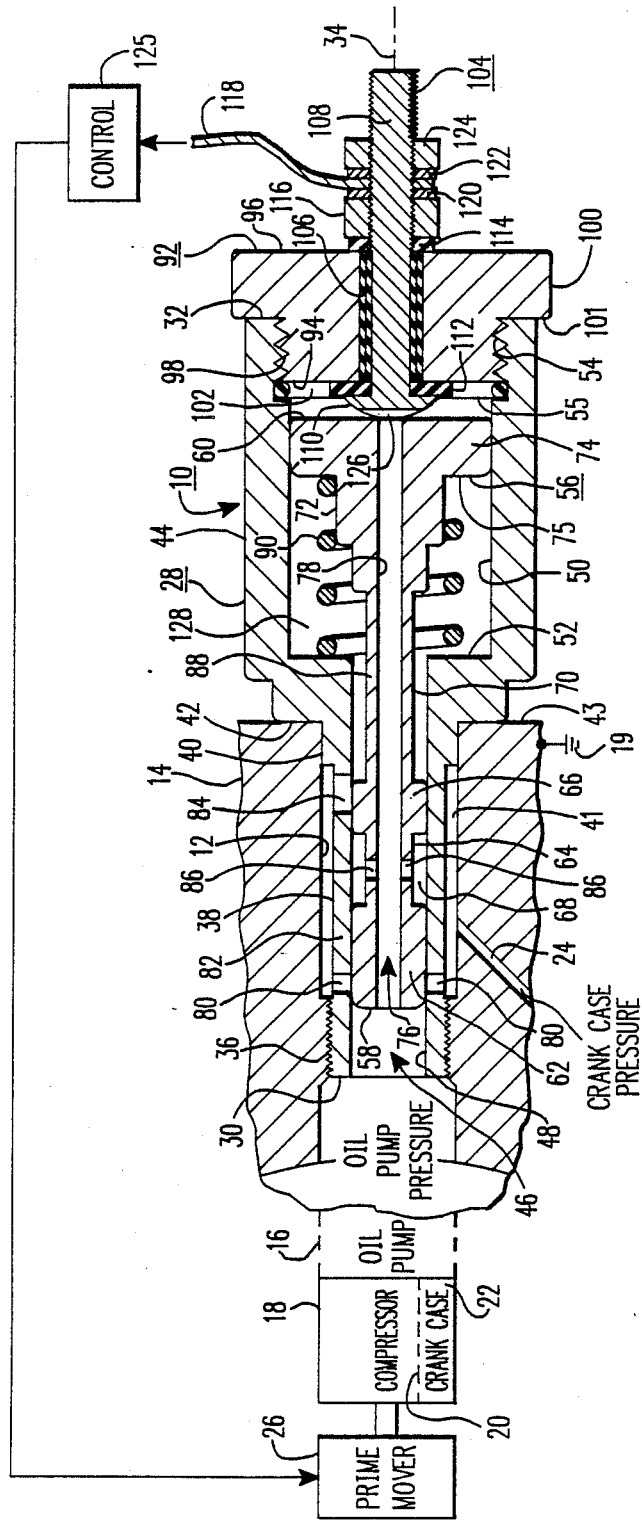
FIG. 1 is cross-sectional view of an oil pressure regulator and indicator constructed according to the teachings of the invention, with a movable piston of the regulator and indicator shown in an indicating position, indicating that oil pressure being monitored is below a predetermined minimum value.

Turning now to the drawings, FIG. 1 is a cross-sectional view of an oil pressure regulator and low oil pressure indicator 10, hereinafter referred to simply as regulator 10, which is constructed according to the teachings of the invention. Regulator 10 is disposed in a bore 12 of a housing 14 associated with an oil pump 16 and a refrigerant compressor 18. Housing 14 is electrically grounded, as illustrated at 19. Oil pump 16 obtains oil 20 from an oil sump or crankcase 22 of compressor 18. Housing 14 includes an integral oil return or leak passage 24 which interconnects bore 12 with crank case 22. Another passage (not shown) in housing 14 provides a supply of oil 20 for pump 16. Compressor 18 and pump 16 are driven by a suitable prime mover 26, such as an electric motor or internal combustion engine.

A suitable arrangement of compressor and pump housings, bores, and interconnecting integral oil flow passages which may be used, is clearly shown in the hereinbefore mentioned U.S. Pat. No. 4,586,875, and this patent is hereby incorporated into the present application by reference. For example, using the reference numerals in FIG. 2 of the incorporated patent, regulator 10 may be installed in bore 44 of cover 32, replacing the conventional pressure regulator 70 shown in FIG. 3 of the incorporated patent. An external pressure switch and balance line, which would normally be added to the arrangement of the incorporated patent, is not required by the present invention, as the pressure switch function is also provided by regulator 10.

Regulator 10 includes an elongated, cylindrical regulator housing 28 having first and second axial ends 30 and 32, respectively, with reference to a longitudinal axis 34. Regulator housing 28 starts with a threaded outer surface 36 having a diameter selected to threadably engage threads located at a predetermined location within bore 12. Proceeding towards, the second end 32, the regulator housing 28 steps inwardly from the threaded portion 36 to a portion 38 which has a diameter less than the diameter of bore 12, and then portion 38 steps outwardly to a portion 40 which is a snug but slidable fit with bore 12. Thus, a chamber 41 is provided between regulator housing 28 and bore 12, which chamber is in fluid flow communication with oil leak passage 24 and the crank case 22 of compressor 18.

At the outer end of bore 12, regulator housing 28 steps outwardly to define a shoulder 42 which rests against a surface 43 surrounding bore 12. Regulator housing 28 then steps outwardly to a portion 44 which has the largest diameter of the housing, which portion continues to the second end 32 of housing 28.

Regulator housing 28 defines an axially extending cavity 46 which extends between ends 30 and 32. Cavity 46 is defined by inner surface 48 which starts at the first end 30, with surface 48 having a first predetermined inner diameter. When cavity 46 enters the portion of housing 28 which is located within the portion 44 having the largest outer diameter, cavity 46 steps sharply outward to a portion 50, providing a shoulder 52 at the transition. Portion 50 steps outwardly to a threaded portion 54 adjacent to the second axial end 32 of regulator housing 28, forming a shoulder 55 at the transition.

Regulator 10 includes an elongated, cylindrical, electrically conductive piston 56 having first and second axial ends 58 and 60, respectively, with reference to longitudinal axis 34. Piston 56 starts at the first axial end with a portion 62 having a diameter selected to be a snug but smoothly axially slidable fit with portion 48 of regulator housing 28. Portion 62 continues for a predetermined dimension and then piston 56 steps inwardly to a portion 64 having a diameter less than the inner diameter of portion 48. Portion 64 continues for a predetermined dimension and then piston 56 steps outwardly to a portion 66 which has a diameter equal to the diameter of portion 62, forming a chamber 68 between piston 56 and regulator housing 28. Portion 66 continues for a predetermined dimension and piston 56 again steps inwardly to a portion 70 which has a diameter less than the inner diameter of portion 48 of housing 28, such as a diameter equal to the diameter of portion 64. Portion 70 continues for a predetermined dimension and piston 56 then steps outwardly to a portion 72 which has a diameter greater than the diameter of portion 48 of regulator housing 28.

Portion 72 continues for a predetermined dimension and then piston 56 steps sharply outward to a portion 74 which defines the largest diameter of piston 56, forming a shoulder 75 at the transition. The diameter of portion 74 is selected to be a snug but smoothly slidable fit with portion 50 of housing 28. Portion 74 continues to the second axial end 60 of piston 56.

Piston 56 defines an axially extending cavity 76 which extends between the axial ends 58 and 60. Cavity 76 is defined by a surface 78 which may have a constant diameter from end to end.

Regulator housing 28 includes a plurality of oil pressure relief ports or apertures 80, such as four equally spaced apertures, with two being shown in the Figures. Apertures 80, which extend completely through the wall 82 of housing 28 formed by cavity 46, are located in portion 38, close to the transition between portion 38 and threaded portion 36. Regulator housing 28 further includes a balance port or aperture 84 through wall 82, with balance port 84 being in portion 38, close to the transition between portion 38 and portion 40.

Piston 56 includes a plurality of pressure relief ports or apertures 86, such as four equally spaced apertures, with two being shown in the Figures. Apertures 86, which extend completely through the wall 88 of piston 56 formed by cavity 76, are located in portion 64 of piston 56, joining cavity 76 with chamber 68.

Piston 56 is disposed within the cavity 46 defined by regulator housing 28, with bias means in the form of an electrically conductive compression spring 90 disposed to bias piston 56 towards the second axial end 32 of housing 28. Shoulders 52 and 75 of housing 28 and piston 56, respectively, function as spring seats for spring 90.

A fluid-tight cylindrical cap 92 seals the second axial end 32 of regulator housing 28. Cap 92 has first and second axial ends 94 and 96. Cap 92 starts with a threaded portion 98 adjacent to the first axial end 94, with portion 98 having a diameter which enables portion 98 to threadably engage portion 54 of housing 28. Cap 92 then steps outwardly to a portion 100 which continues to the second axial end 96, forming a shoulder 101 at the transition. An 0-ring 102 may be placed within cavity 46 of housing 28, on shoulder 55, before cap 92 is engaged with housing 28, such that the first axial end 94 of cap 92 will effectively compress the 0-ring 102 as shoulder 101 reaches and engages the second axial end 32 of housing 28.

An electrically conductive member, such as a bolt 104, is insulatively carried by cap 92. Bolt 104 includes shank and head portions 108 and 110, respectively. Cap 92 includes a centrally extending cavity between axial ends 94 and 96 which snugly receives an electrically insulative bushing 106 having an opening sized to snugly receive the shank portion 108 of bolt 104. The head portion 110 of bolt 104 is insulatively spaced from the first axial end 94 of cap 92 by an insulative washer 112. Shank 108 extends outwardly from the second axial end 96 of cap 92, an insulative washer 114 is disposed about shank 108, and a nut 116 is threadably engaged with shank 108 to hold bolt 104 in assembled relation with cap 92. An electrical control wire 118 is electrically connected to bolt 104, such as by metallic washers 120 and 122 and a nut 124. Control wire 118 is connected to control 125, which is operatively connected to prime mover 26, such that prime mover 26 is shut down when electrical lead 118 is grounded.

In the operation of regulator 10, pressure developed by oil pump 16 is communicated to the second axial end 60 of piston 56 via cavity 76. Bolt head 110 may be slotted as illustrated at 126 to prevent bolt head 110 from sealing cavity 76. When oil pump 18 is not operative, and when it is not developing a predetermined minimum pressure, such as about 5 or 10 psig, spring 90 will force piston 54 against bolt head 110, connecting control wire 118 to electrical ground 19 via bolt 104, piston 56, spring 90, regulator housing 28, and housing 14 associated with oil pump 16 and compressor 18. Control 125 will shut prime mover 26 down. Control 125 includes a contact which prevents shut down of prime mover 26 during starting thereof, for a time sufficient to build oil pressure above the predetermined minimum level.

When oil pressure builds properly, the pressure, being communicated to the second axial end 60 of piston 56 via cavity 76, develops a force against the second axial end which opposes the force applied to shoulder 75 by spring 90. The proper low pressure is assured within the spring compartment 128, required for proper operation of piston 56, as it will be noted that compartment or chamber 128 is in fluid flow communication with the crank case 22 and thus crank case pressure, via balance port 84, chamber 41, and passageway 24.

Figure 2:
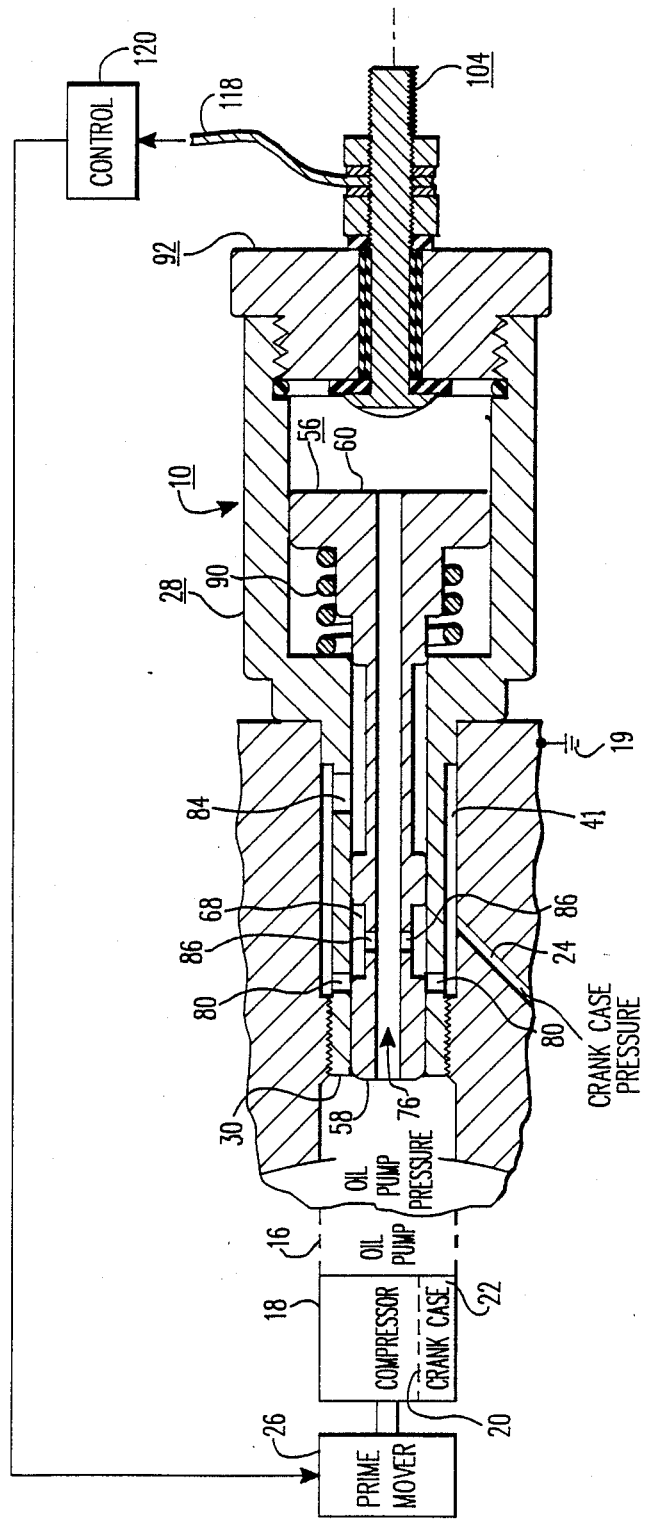
FIG. 2 is a cross-sectional view of the oil pressure regulator and indicator shown in FIG. 1, except with the piston shown in a pressure regulating position.

As oil pressure builds, piston 56 is moved towards the first axial end of regulator housing 28. As shown in FIG. 2, at the regulating pressure of regulator 10, a fluid flow path is established between cavity 76 of piston 56 and crank case 22. Piston 56 moves towards the first axial end 30 of housing until chamber 68, which includes apertures 86, reaches relief apertures 80 in housing 28. The relief path is opened to the extent necessary to hold the predetermined regulated value of oil pressure, such as 45 psig.

In summary, regulator 10 may be substituted for a conventional oil pressure regulator of a refrigerant compressor. Any external low oil pressure switch and its balance line may be removed and the resulting openings tightly plugged. Regulator 10 will provide both a pressure regulating function, and a low oil pressure detection function, without any external balancing line.

I claim:

1. An oil pressure regulator and low oil pressure indicator for regulating and monitoring the oil pressure of a compressor oil pump operatively associated with a compressor having a low pressure crank case containing compressor lubricating oil to be distributed at higher pressure to compressor lubricating points, comprising:

an elongated regulator housing having first and second ends, said regulator housing defining a central cavity which extends between the first and second ends of the housing, with said first end defining an inlet passage for communication with the oil pressure to be monitored and regulated, a fluid-tight cap at the second end of said regulator housing, an elongated electrically conductive piston having first and second ends, said piston defining a central cavity which extends between the first and second ends of the plunger, said piston being disposed for axially slidable movement within the cavity of said regulator housing, bias means urging said piston towards the second end of said regulator housing, the central cavity of said piston communicating oil pressure to the second end of said regulator housing to develop a force on said piston which opposes the bias means, relief apertures in said regulator housing and in said piston which provide an oil pressure regulating relief path when an oil pressure is reached which overcomes the bias means and moves the piston a predetermined dimension away from the second end of said regulator housing, and an electrically conductive member insulatively carried by said cap which is accessible within the cavity defined by the regulator housing, said piston contacting and grounding said electrically conductive member when the oil pressure is insufficient to overcome the bias means and move the piston away from the second end of the regulator housing, to provide an indication that the oil pressure is below a predetermined magnitude.

2. The oil pressure regulator and indicator of claim 1 wherein the bias means is an electrically conductive compression spring.

3. The oil pressure regulator and indicator of claim 1 wherein the electrically conductive member carried by the cap is a slotted head bolt, with the slot preventing said bolt from closing the aperture defined by the piston when the piston contacts said bolt.

4. The oil pressure regulator and indicator of claim 1 wherein the oil pressure relief path is in fluid flow communication with the compressor crank case.

5. The oil pressure regulator and indicator of claim 1 including a balance port in the regulator housing disposed in fluid flow communication with the crank case of the compressor.

6. The oil pressure regulator and indicator of claim 1 including a compressor housing associated with the compressor which defines an oil return path surrounding the portion of the regulator housing which includes the relief aperture, for returning oil to the crank case.

7. The oil pressure regulator and indicator of claim 6 including a venting aperture in the regulator housing disposed in fluid flow communication with the oil return path, to provide crank case pressure on the bias means side of the piston.

8. The oil pressure regulator and indicator of claim 1 wherein the second end of the piston includes an enlarged cylindrical portion having first and second sides for respectively receiving bias and oil pressure forces, and including a balance port in the housing which communicates crank case pressure to the first side of the cylindrical portion of the piston.

* * * * *